July 2, 1929.  B. M. SHIPLEY  1,719,383
CASH REGISTER
Filed Nov. 3, 1921   8 Sheets-Sheet 1
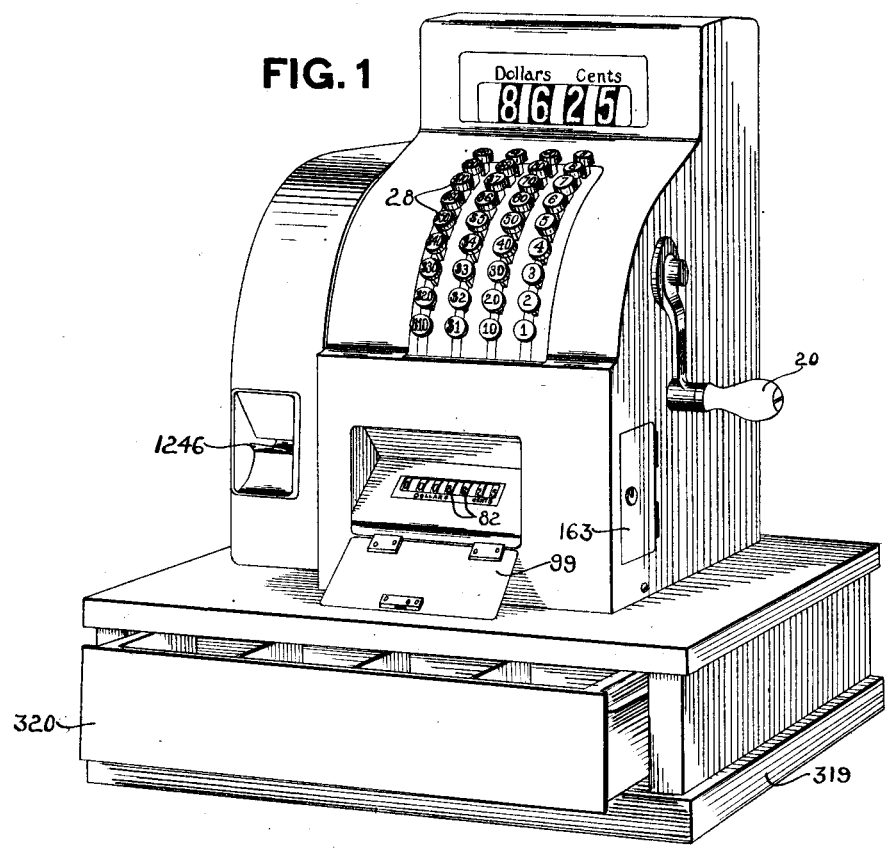
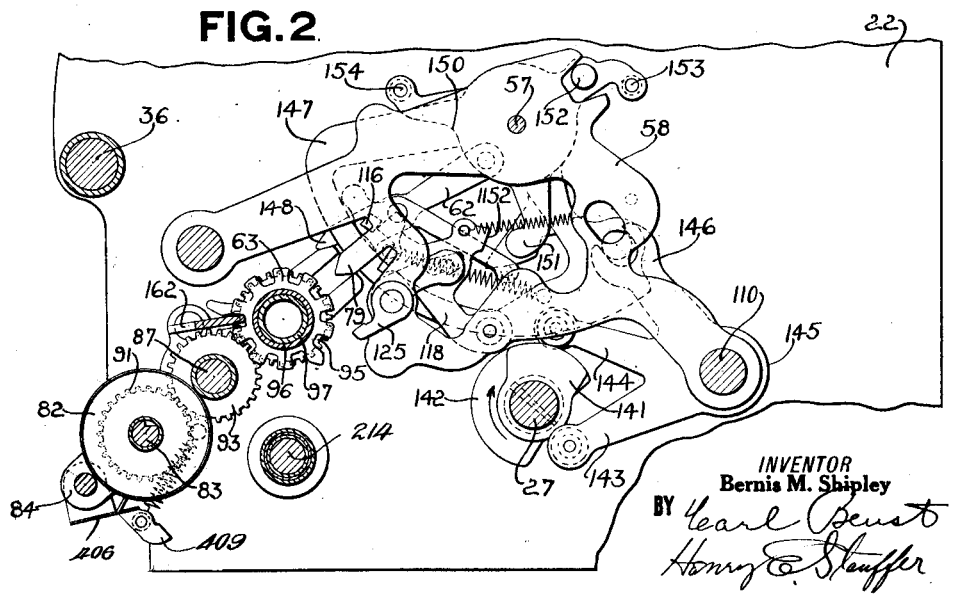
INVENTOR
Bernis M. Shipley
ATTORNEYS

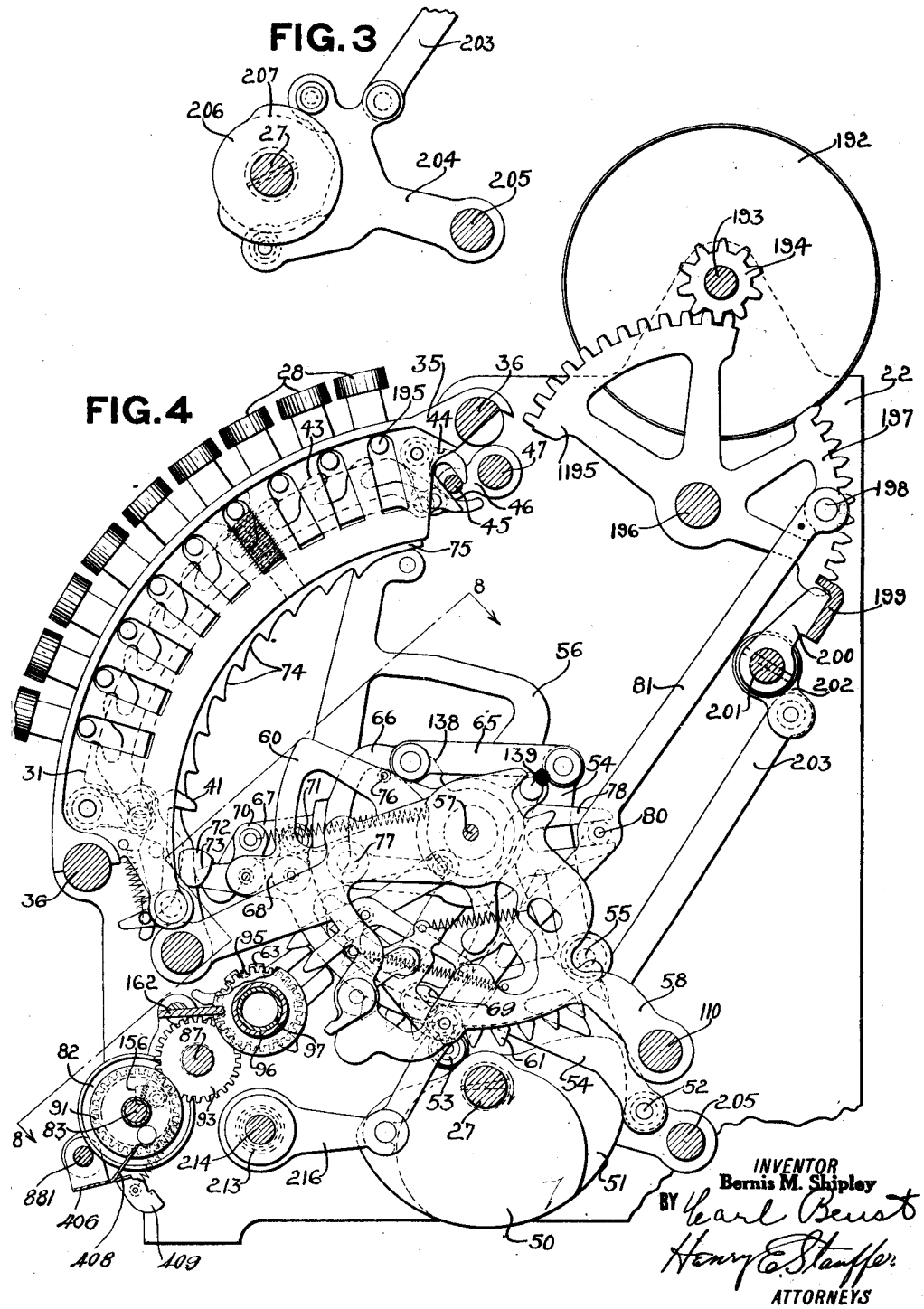

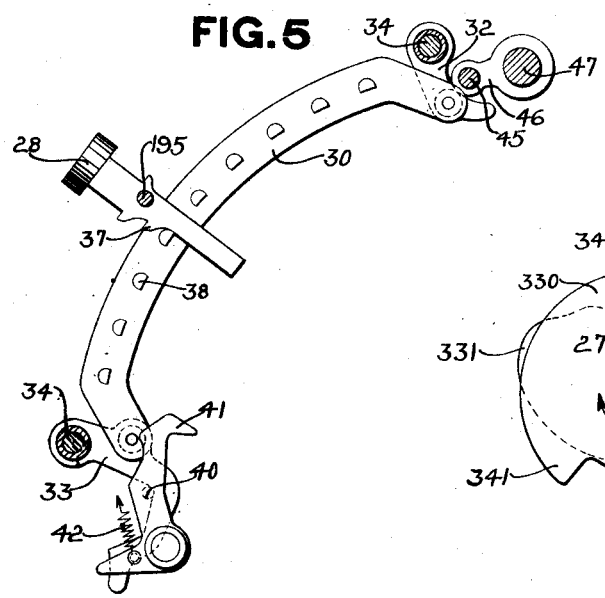
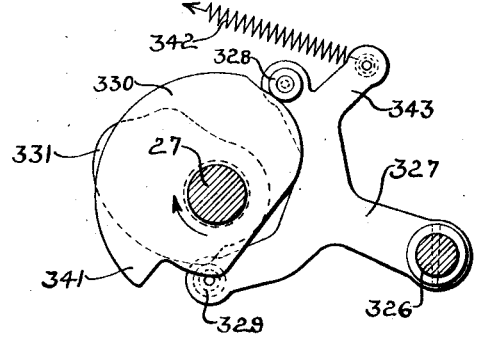
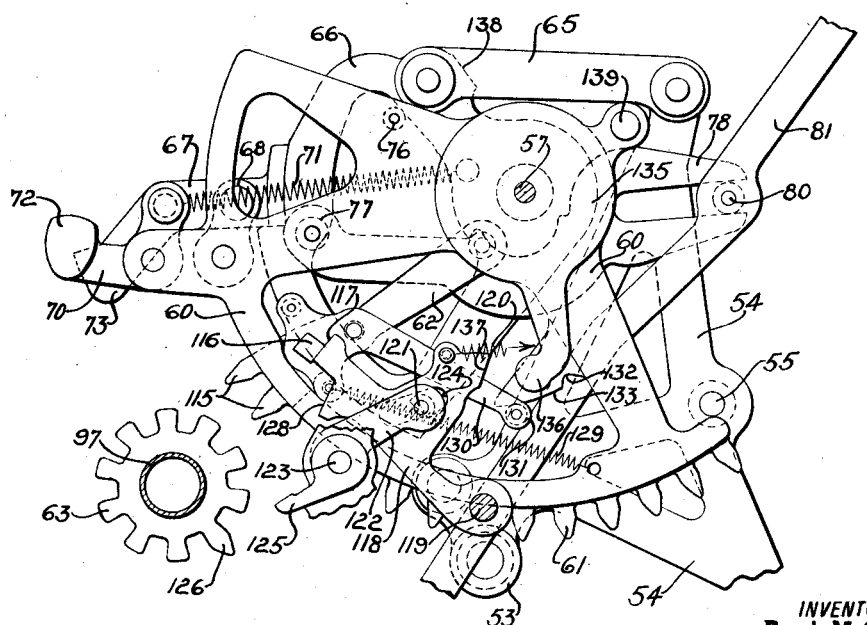

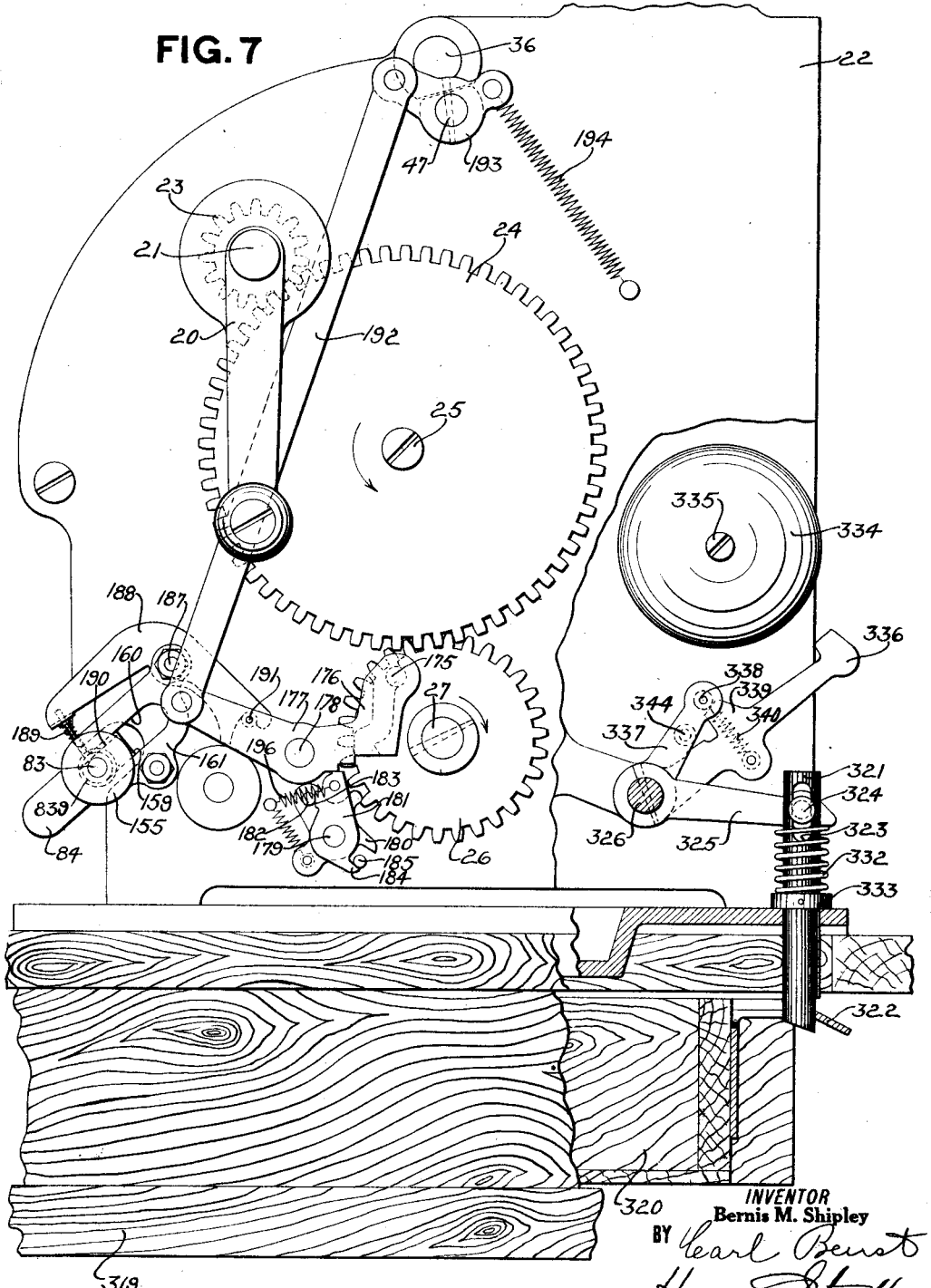

July 2, 1929.  B. M. SHIPLEY  1,719,383
CASH REGISTER
Filed Nov. 3, 1921   8 Sheets-Sheet 5

INVENTOR
Bernis M. Shipley
BY Pearl Benst
Henry E Stauffer
ATTORNEYS

July 2, 1929.   B. M. SHIPLEY   1,719,383
CASH REGISTER
Filed Nov. 3, 1921   8 Sheets-Sheet 6
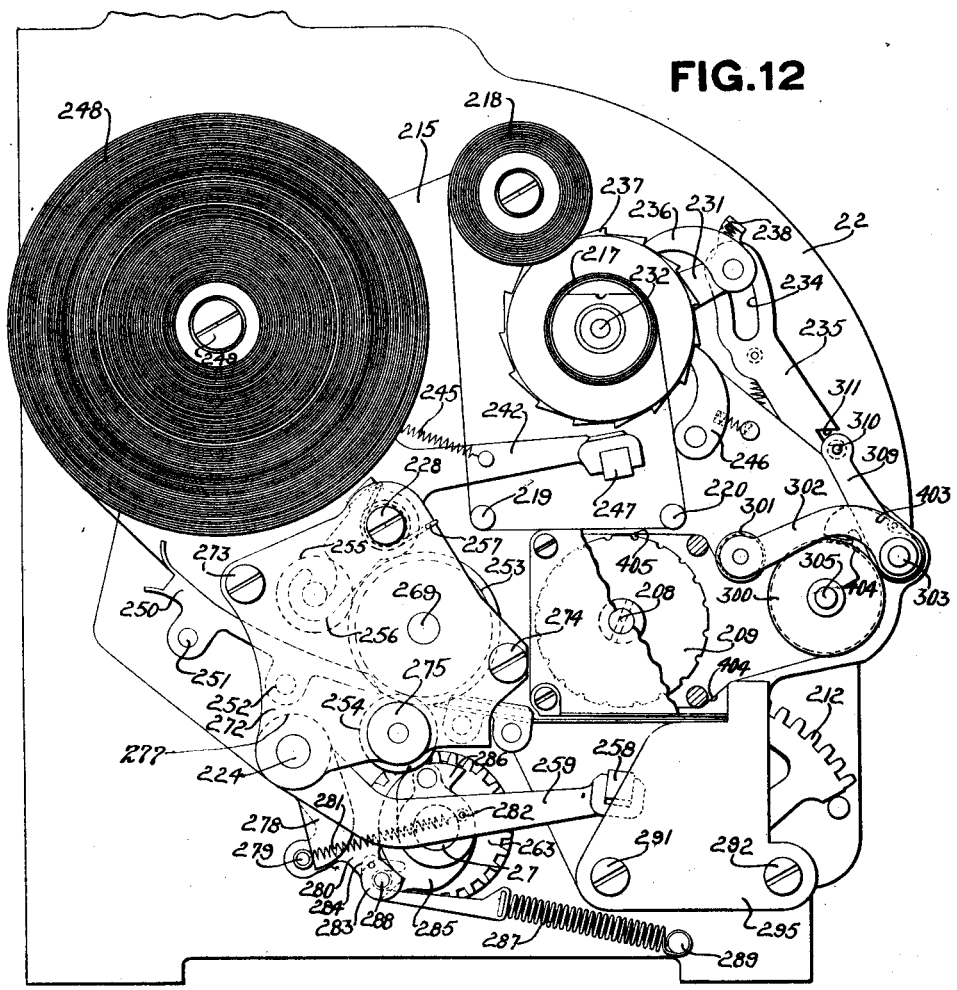
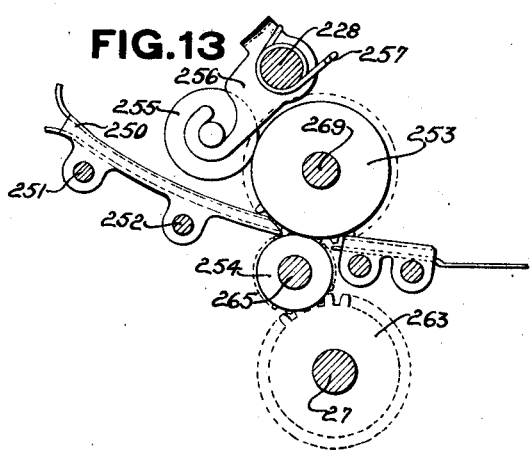
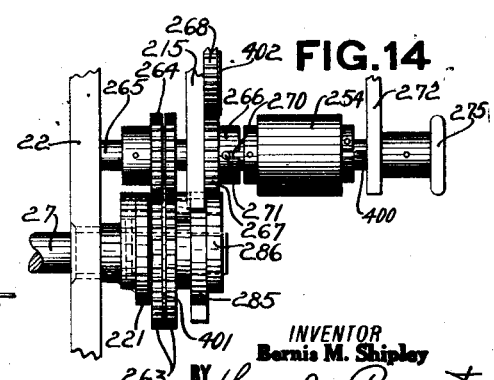
INVENTOR
Bernis M. Shipley
ATTORNEYS July 2, 1929.  B. M. SHIPLEY  1,719,383
CASH REGISTER
Filed Nov. 3, 1921  8 Sheets-Sheet 8

Inventor
Bernis M. Shipley
By *Earl Beust*
*Henry E. Stauffer*
His Attorneys

Patented July 2, 1929.

1,719,383

UNITED STATES PATENT OFFICE.

BERNIS M. SHIPLEY, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

CASH REGISTER.

Application filed November 3, 1921. Serial No. 512,473.

One object of the present invention is to construct a small, compact machine which will perform the various functions mentioned hereinafter.

Another object of the invention is to provide a novel interlocking mechanism between the totalizer and the operating mechanism.

Another object of the present invention is to provide a machine of this type with a visible totalizer.

A further object of this invention is to provide novel means to clear or reset the totalizer to zero.

Still another object is to provide a totalizer shiftable axially as well as towards and from its actuators as usual, together with a single aligning means to prevent accidental rotation of the totalizer elements when the totalizer is in its axially shifted position as well as when it is in its normal home position disengaged from its actuators.

A still further object of this invention is to provide means to prevent the accidental shifting of the totalizer from its normal position axially towards its resetting position.

Still another object of this invention is to arrange that the totalizer in shifting axially, shall control the means which locks the machine against operation.

With these and incidental objects in view, the invention consists of certain novel features of construction and combinations of parts, the essential elements of which are set forth in appended claims, and a preferred form of embodiment of which is hereinafter described with reference to the drawings which accompany and form a part of the specification.

Of said drawings:

Fig. 1 is a perspective view of the assembled machine with the cabinet thereon. The door for normally closing the opening through which the totalizer wheels may be seen is shown in its open position.

Fig. 2 is a detail sectional view taken on the line 2—2 of Fig. 8 looking in the direction of the arrows.

Fig. 3 is a detail side elevation of the indicator alining mechanism.

Fig. 4 is a section through the complete machine taken between the units of cents and tens of cents banks, looking toward the left.

Fig. 5 is a detail view of the key detent and its zero stop pawl.

Fig. 6 is a detail sectional view showing the actuating and transfer mechanisms.

Fig. 7 is a right side elevation of the machine showing the operating mechanism, the interlocking mechanism and the bell ringing and drawer release mechanisms.

Fig. 12 is a left side elevation of the printing mechanism.

Fig. 13 is a detail view partly in section of the check feeding means.

Fig. 14 is a rear elevation of the mechanism for disabling the check feeding means.

Fig. 18 is a detail view of the cams and the arm for operating the alarm and drawer releasing mechanisms.

Figure 8:
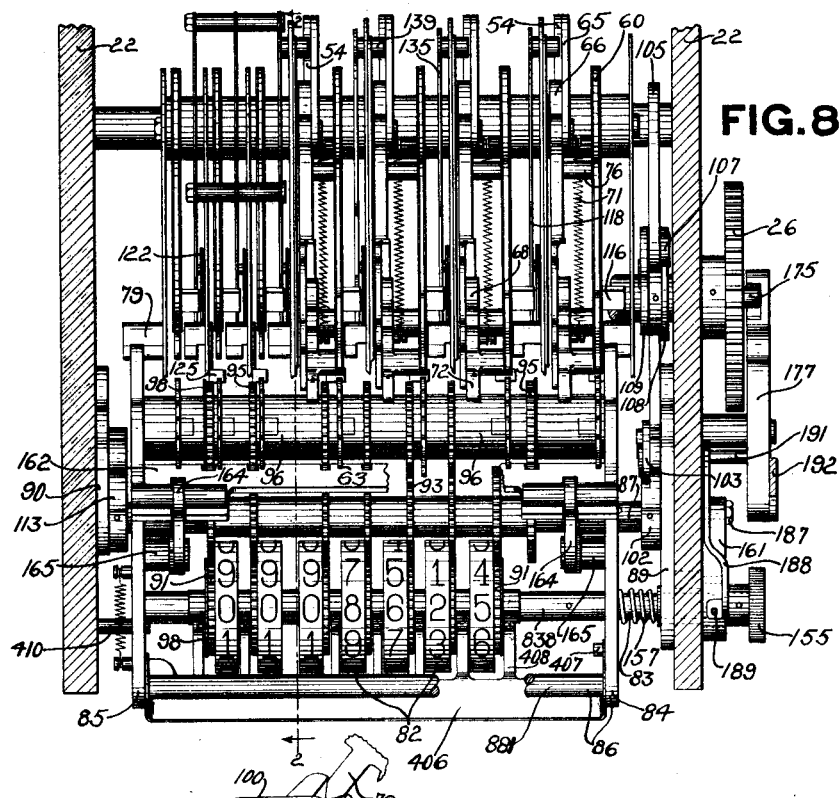
Fig. 8 is a plan view taken on the line 8—8 of Fig. 4.

The machine shown in the present application is of the general type shown and described in United States Letters Patent No. 1,230,864, issued June 26, 1917, to W. A. Chryst and No. 1,242,170, issued October 9, 1917 to F. L. Fuller.

In its present embodiment, the invention is shown as having four banks of amount keys, and a registering capacity of $99.99.

A single totalizer is provided which is normally concealed but to which access may be had by properly authorized persons for the purpose of reading the amount standing thereon. The totalizer has higher order auxiliary adding wheels which give it a capacity of $99,999.99. Indicators are also provided for indicating every amount which is entered in the totalizer.

The machine is equipped with printing mechanism for printing the amount entered in the totalizer on a detail strip and a check. Means for disabling the check issuing mechanism is also included in the printing mechanism.

Interlocking mechanism is provided for locking the machine while the totalizer is being reset to zero and also for locking the totalizer against a resetting movement during the operation of the machine.

*Operating mechanism.*

In the embodiment shown herein, the machine is adapted to be operated by means of a crank handle 20 (Figs. 1 and 7) fast on the end of a short shaft 21 carried by the right hand side frame 22 of the machine. Also fast on the shaft 21 is a gear 23, the teeth of which mesh with a large gear 24 rotatably mounted on a stud 25 supported by the right hand side frame 22. The teeth of the gear 24 in turn mesh with the teeth of a gear 26 fast on the right hand end of a shaft 27 journaled in the side frames, from which the mechanism of the machine receives its motion. The gears 23, 24 and 26 are so proportioned that the handle 20 must be given two complete turns to effect one complete rotation of the main driving shaft 27. Each operation of the machine requires one complete rotation of the shaft 27.

*Releasing mechanism.*

Figure 19:
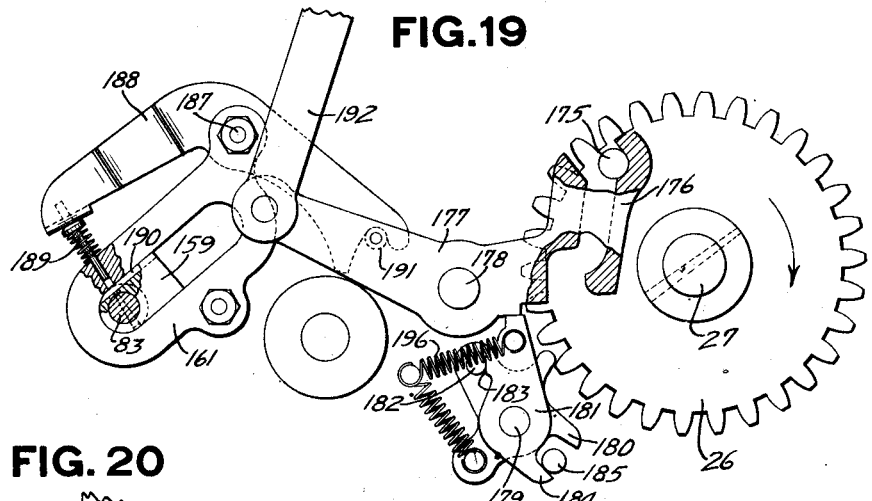
Fig. 19 is an enlarged detail view of the interlock between the operating mechanism and the resetting mechanism.

The machine is normally locked against operation and is released by a slight reverse movement of the crank 20 before the same is rotated. Projecting from the gear 26 which is fast to the right hand end of the driving shaft 27 is a stud 175 which is adapted to cooperate with a cam groove cut in the inner face of an arm 176 of a locking lever 177 pivoted on a stud 178 in the side frame 22. The stud 175 (as shown in Figs. 7 and 19) is normally in engagement with a recess in the wall of said cam groove to lock the gear 26, and thereby prevent the operation of the machine. When it is desired to operate the machine, the crank handle 20 is given a slight counter-clockwise rotation. This movement of the crank handle is transmitted by the gear 24 to the gear 26 and moves this gear in a counter-clockwise direction.

Projecting between two of the teeth of the gear 26 is one arm of a spring-held three-armed lever 180 (Fig. 19) pivoted on a stud 179 in the side frame 22. Also loose on the stud 179 is a supporting pawl 181, the nose of which normally engages the lowermost one of a series of steps cut in the lower edge of locking lever 177, to hold said lever in its normal position with the recess of its cam groove lying in the path of the locking stud 175 on the gear 26. Projecting from an upwardly extending arm of the three-armed lever 180 is a pin 182 which contacts with a flat shoulder 183 on the pawl 181. When the gear 26 is rotated slightly in a counter-clockwise direction by the reverse movement of the crank handle 20 to release the machine for operation, the gear 26 rocks the three-armed lever 180 clockwise about its pivot 179, whereupon the pin 182 which engages the supporting pawl 181 will rock the same clockwise, moving the nose thereof from under the first step on the locking lever 177. The locking lever 177 is spring-pressed in a clockwise direction, as will be presently described, and therefore, when the supporting pawl 181 is moved out from under the lowermost step of the locking lever, the latter lever will be rocked about its pivot 178 until the second step on the lever rests on the supporting pawl 181. This movement of gear 26 frees the stud 175 on the gear 26 from the recess in the groove cut in the arm 176 of the locking lever 177.

The three-armed lever 180 also prevents the operation of the gear 26 in a reverse direction to a greater extent than is necessary to release the machine, and also prevents the turning backwardly of the crank handle 20 at any time during its rotation in clockwise direction. Projecting from the lever 180 is a downwardly extending finger which is adapted to strike a fixed pin 185. When the crank is turned in a reverse or counter-clockwise direction, the three-armed lever 180 is rotated in a clockwise direction through its engagement with the teeth of the gear 26. It can be seen from Figs. 7 and 19, however, that when the crank handle is turned a short distance in counter-clockwise direction said finger on lever 180 will come into contact with the fixed pin 185 and prevent further backward movement of the gear 26.

Pawl 181 has a finger 184 which normally contacts with pin 185 to limit counter-clockwise movement of pawl 181.

The locking lever 177 is normally maintained under spring tension, for the purpose of rocking it in a clockwise direction (Fig. 7), by means of the following connections. Pivoted to the forwardly extending arm of the locking lever 177 is a link 192 which at its upper end is pivoted to a forwardly extending arm of a bell crank 193 fast to a release shaft 47 journaled in the side frames of the machine. A spring 194 constantly tends to move the bell crank and locking lever 177 in a clockwise direction.

When the gear 26 begins its clockwise movement, the stud 175 passes out of the upper end of the cam groove in the locking lever 177 (Fig. 19). Near the end of the operation of the machine, the stud 175 on the gear 26, which gear at this time has almost completed a rotation, re-enters the cam groove at its lower end. This cam groove is so formed that, as the stud 175 passes through it, the locking lever 177 is rocked in counter-clockwise direction a sufficient distance to permit the spring 196 to move the supporting pawl 181 towards the left (Fig. 7) to again engage the first step on the arm 176, thereby maintaining the arm in its raised position and locking the gear 26 against further movement until it is once more released.

Key-board.

The key-board comprises four banks of amount keys 28. The amount key banks are substantially the same as those shown and described in the above mentioned Chryst and Fuller patents and therefore, but a brief description of them will be given herein. The keys 28 (Figs. 1, 4 and 5), cooperate with key detent bars 30 and locking detent bars 31. The detent bars 30 are supported at their upper and lower ends, respectively, by arms 32 and 33, pivoted on studs 34 on the key frame 35. The key frame 35 is mounted on cross rods 36 carried by the side frames 22. When a key is depressed, the inclined edge of the shoulder 37 on the key shank engages a corresponding pin 38 of the detent bar 30, thereby moving the latter downwardly until the shoulder is past the pin, when the detent bar rises slightly and retains the key in depressed position. The arm 33 engages a pin 40 on a zero stop pawl 41 normally in effective position, and when the detent bar 30 is moved downwardly said pawl 41 is rocked counter-clockwise (Fig. 5) to render it ineffective. A spring 42 serves to retain the pawl and the detent bar 30 in normal position. The locking detent bars 31 for the banks of amount keys are provided with extensions 43, which, immediately upon the release of the machine for operation, pass over the pins 195 on the depressed keys and under the pins 195 on the undepressed keys, thereby preventing manipulation of the keys during an operation of the machine.

The locking detent bar 31 is supported at its upper end by an arm 44, which is provided with a slot through which extends a rod 45 carried by the arms 46 fast on the key release shaft 47. This shaft 47 is rocked clockwise (Figs. 4 and 5) upon the release of the machine by the handle 20, as hereinbefore described, whereupon the rod 45 rocks the arms 44, thereby moving the locking detents 31 upwardly into their locking positions. Near the end of an operation of the machine, the key release shaft 47 is rocked in a counter-clockwise direction, and the rod 45 carried by the arms 46 is lowered. As the rod actuates the arms 44 supporting the locking detents, these detents will be returned to their normal positions. The key detent bars 30 are also moved downwardly upon the movement of rod 45 through its contact with the arm 32, thereby freeing the pins 38 from the projections 37 and permitting the depressed keys 28 to return to their normal positions.

Differential mechanism.

To drive the differential mechanism, the drive shaft 27 is provided with a plurality of pairs of cams 50 and 51 (Fig. 4), each pair cooperating with rollers 52 and 53 carried by Y-shaped levers 54 pivoted at 55 on frames 56. Loose on a rod 57 extending through all of the differential units, and adjacent the amount banks, are differentially movable actuators 60 carrying racks 61 and transfer arms 62 for operating totalizer pinions 63. The upper ends of the levers 54 are connected by links 65 to driving segments 66 loose on the rod 57. The segments 66 adjacent the banks of amount keys are connected to the differentially movable actuators 60 by latches 67, each of which is supported by a link 68 and a lever 70 pivoted on the corresponding differential actuator. Springs 71 hold the rear ends of the latches 67 in engagement with the shoulders on the driving segments 66. When the segments 66 associated with the amount keys are oscillated by their cams 50 and 51, the actuators 60 are rocked clockwise with their latches (Figs. 4 and 5) until the noses 72 of the levers 70 engage the depressed amount keys. Such engagement results in the disengagement of the latches from the driving segments and the engagement of the ends 73 of the latches 67 with the particular notches 74, formed in plates 75, opposite the latches at the time. Upon return movement of the segments 66 to their normal positions, said segments engage studs 76 carried by the actuators 60 and return the actuators to their normal positions. If no key has been depressed in an amount bank, the zero stop pawl 41 for that particular bank operates the latch to hold the actuator 60 in the zero position. However, when a key is depressed, the arm 33 rocks the zero stop pawl 41 counter-clockwise to ineffective position, as previously described.

Pivoted to each of the actuators 60 at a point 77 is a beam 78 bifurcated at its rear end to straddle a stud 80 near the center of a link 81. After the front end of the beam is positioned by the actuator 60, the middle portion of said beam is driven up by a roller 69 on the Y-shaped lever 54. The links 81 are thereby given a differential movement commensurate with the key depressed, and as each link is connected at its upper end to the indicator for that particular bank, and at its lower end to a sleeve which drives the type carrier for that bank, both of these elements will receive the proper differential movement. Their operation will be hereinafter described.

Totalizer.

The totalizer shown and described in connection with the present invention is of the "Reading" type, and consists of a series of indicating totalizer wheels 82 (Figs. 2, 4 and 8) loosely mounted on a shaft 83, supported by the side arms 84 and 85 of a totalizer frame 86. The frame 86 is supported, intermediate its front and rear, by a shaft 87, the ends of which cooperate with slots 88 in guide plates 89 and 90, fast to the side frames 22 of the machine. Each totalizer wheel 82 has fast to the side thereof a pinion 91 meshing with its respective intermediate pinion 93 loose on the shaft 87. The intermediate pinions mesh with pinions 95 carried by a plurality of nested sleeves 96 supported by a tube 97 fastened to the totalizer frame arms 84 and 85. A rod 881 attached to the projecting forward ends of the arms 84 and 85 completes the totalizer frame. There is one sleeve 96 for each pinion 95, and each sleeve carries a totalizer pinion 63 adapted to mesh with the rack 61 of the differentially movable actuator 60 corresponding to that particular denomination. It can, therefore, be seen that when the differentially movable actuator 60 for any of the amount banks is rocked in adding operations, the differential movement thereof will be transmitted to the visible totalizer wheel 82 corresponding thereto by the pinions 95, 93 and 91, and the corresponding totalizer wheel 82 will be turned a distance commensurate with the value of the key depressed.

A yoke 406, pivoted on the rod 881, is spring-pressed against a stud 407 carried by the totalizer frame arm 84 to bring its fingers 408 (Figs. 4, 8 and 9) into cooperative relation with zero alining studs carried by the totalizer wheels 82 as the wheels reach their zero positions during a resetting operation. The yoke 406 also carries an arm 409 for cooperation with a stud 410 (Fig. 8) on the side frame 22 to shift the fingers 408 out of the path of movement of the studs on the totalizer wheels 82 as the totalizer is moved into position to receive entries.

The intermediate pinions 93 are loosely mounted on the shaft 87 and are held in alinement with the pinions 91 and 95 by spacing sleeves on said shaft and by disks 98 secured to the end pinions 91 and 95.

An opening is provided in the casing of the machine (Fig. 1) through which the totalizer wheels 82 may be viewed, for the purpose of reading the amount standing thereon. This opening, however, is normally closed by a door 99 which can be opened only by the proprietor or his authorized agent.

Totalizer engaging mechanism.

It will be understood that the totalizer is normally out of engagement with the racks 61 of the differentially movable actuators 60 and is engaged therewith at every operation of the machine. The mechanism for effecting the engagement and disengagement of the totalizer will now be described. It will be recalled that the totalizer is supported in the totalizer frame 86, which frame is, in turn, supported by the shaft 87, the ends of which are slidably mounted in slots 88 in the guide plates 89 and 90 fast to the side frames 22 of the machine. The guide plate 89 has a slot 100 (Fig. 9) in which rides a roller 101 carried by an arm 102 fast on the right hand end of the shaft 87 and connected by a link 103 to one arm of a bell crank lever 105 pivoted at 110 to the frame of the machine. The bell crank lever 105 carries two rollers 106 and 107 cooperating with cams 108 and 109 fast on the drive shaft 27. When the shaft 27 is given its rotation (Fig. 9) the bell crank lever 105 will not move during the first half of the rotation, as the peripheries of the cams 108 and 109 are at that time concentric with the drive shaft 27. However, at the beginning of the second half of the rotation of the drive shaft 27, the cams 108 and 109 rock the bell crank lever 105 clockwise, and by means of link 103, the roller 101 will be caused to traverse the slot 100. As the roller 101 is carried by the arm 102 fast on the shaft 87, the shaft 87, and therefore, the totalizer-supporting frame 86, will also be shifted to engage the pinions 63 with the racks 61 of the differentially movable actuators 60 for the purpose of being turned differentially. The cams 108 and 109 are so shaped that the roller 101 will be held in its shifted position for a sufficient time to permit the differentially movable actuators 60 to actuate the pinions 63. Near the end of the rotation of the driving shaft 27, the cams 108 and 109 will rock the bell crank lever 105 counter-clockwise (Fig. 9), and through the link 103, return the roller 101, the shaft 87 and the totalizer-supporting frame 86, to their normal home positions wherein the pinions 63 are out of engagement with the actuators 60.

The guide plate 90 (Fig. 8) fast on the left hand side frame 22 of the machine, has a slot cut therein identical with the slot 100 in plate 89. Fast on the left hand end of the shaft 87 is an arm 113 which carries a roller This roller cooperates with the slot in the guide plate 90 and as the arm 113 is fast on the shaft 87 it receives the same movement as that given to the arm 102 and shifts the left hand end of the shaft 87 back and forth in the slot 88 of guide plate 85.

The totalizer supporting frame arms 84 and 85 (Figs. 2 and 9) are bifurcated at their upper ends to engage a pair of beveled lugs 79 carried by the differential unit supporting frames 58, for the purpose of guiding the totalizer in its engagement with the differentially movable actuators 60.

Figure 11:
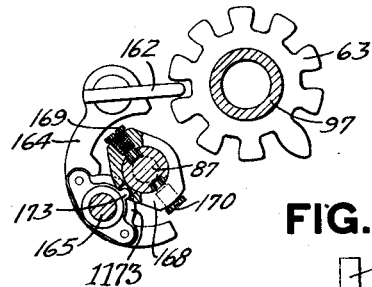
Fig. 11 is a detail sectional view taken just inside of the right hand totalizer supporting frame looking toward the left, and shows in detail the mechanism for operating the totalizer alining mechanism during resetting operations.
Figure 11A:
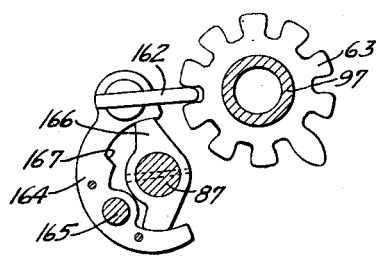
Fig. 11A is a detail side elevation of the mechanism for operating the totalizer aliner on adding operations.

An aliner 162 (Figs. 8 and 11A) is provided to normally engage the teeth of the totalizer pinions 63 and not only aline them but also prevent accidental rotation thereof between operations of the machine. It is, of course, necessary to move the aliner 162 out of its alining position during an operation of the machine, and this is done in the following manner: The aliner 162 is carried by a pair of arms 164 which are pivotally mounted on studs 165 projecting from the totalizer supporting frame arms 84 and 85. Fast on each end of the shaft 87 is a cam 166. It will be remembered that when the totalizer supporting frame 86 is shifted to engage the pinions 63 with the racks 61 of the differentially movable actuators 60, the shaft 87 is rocked in a counter-clockwise direction due to the cam slots 100. This movement of the shaft 87 will bring the cams 166 (Fig. 11A) on the shaft into contact with inclined noses 167 on the aliner supporting arms 164 to cam these arms counter-clockwise about their pivots 165 and thereby rock the aliner 162 out of engagement with the teeth of pinions 63. Near the end of the operation of the machine, the shaft 87 is rocked clockwise to its normal position. This movement will rock the cams 166 in a clockwise direction also to return the aliner 162 to its engagement with the teeth of pinions 63.

*Transfer mechanism.*

Transfer mechanism is provided for transferring from lower to higher denominations. The mechanism shown is old in the art, having been shown and described in both of the Fuller and Chryst patents, above mentioned, and will therefore be but briefly described herein. Mounted on each of the differentially movable actuators 60 is a transfer arm 62 (Fig. 6) carrying two teeth 115. In the normal position of the parts, these two teeth are separated from the rack 61 of the differentially movable actuator 60 by one tooth space (Fig. 6). The transfer arm 62 is normally held in this position due to the engagement of a squared stud 116 mounted on a lever 130 (hereinafter described) carried thereby, with a face 117 of a lever 118 pivoted at 119 to the differential unit supporting frame 58. The lever 118 constantly tends to move in a clockwise direction about its pivot due to the action of a spring 120. It is, however, normally prevented from moving in this direction by a half-round stud 121 carried by an arm 122 fast on a stub shaft 123. This stud 121 engages a shoulder formed in the slot 124 in the lever 118 through which it projects. Fast on the stub shaft 123 is also mounted an arm 125 which the long teeth 126, carried by the pinions 63 engage every time that one of the pinions 63 passes from its "9" to its "0" position. This engagement will rock the arm 125 counter-clockwise (Fig. 6) and the arm 122 will be rocked in the same direction. This movement will carry the half-round stud 121 away from the shoulder in the slot 124 and permit the lever 118 to rock clockwise about its pivot 119 under the action of spring 120. This movement will withdraw the face 117 of the lever from the path of the stud 116 and bring the rearward face 128 thereof into the path of the squared lug 116.

It will be remembered that when the differentially movable actuators 60 are rocked clockwise about the rod 57 at the beginning of an operation of the machine, the totalizer pinions 63 are not in engagement with the racks 61 thereof. However, just before the differentially movable actuators start their return movement to their normal positions, the totalizer is rocked into engagement with the racks 61, and the totalizer is, therefore, actuated differentially upon the return movement of the differentially movable actuators 60 to their normal positions.

When the differentially movable actuator is in adjusted position, the transfer arm 62 is rocked counter-clockwise about its pivot by means of a spring 129, thereby bringing the two teeth 115 immediately adjacent the teeth 61 of the differentially movable actuators 60. When no transfer is to take place, the lever 118 remains in its normal position, and therefore when the actuator 60 restores to its home position the squared stud 116 on the transfer arm 62 will contact with the face 117 of the stop lever 118 as the differentially movable actuator reaches its zero position, and the transfer arm will be held so as not to operate the totalizer wheels.

When, however, during the adding movement of the differentially movable actuator 60, that is, during its downward restoring movement (Fig. 6), the long tooth 126 of a totalizer pinion trips its appropriate arm 125 and thereby releases the lever 118 so that it moves to the position in which the farther face 128 thereof will lie in the path of the squared stud 116, the transfer arm 62 will remain in its position adjacent the rack 61 and will be in a position to turn the totalizer pinion of next higher denomination one additional tooth space, thereby adding "1" to that totalizer element.

The transfer arm 62 has pivoted on it a lever 130 which carries the stud 116. The lever 130 also carries a roll 131 which engages with a notch 132 formed in a projection 133 on the differentially movable actuator 60 whenever the actuator 60 is out of normal position or whenever the lever 118 is released from its normal position by a lower order pinion 63, thus locking the transfer arm 62 in a position immediately adjacent the rack 61. If the transfer arm is in this position when the actuator 60 reaches its "0" position, the pinion 63 appropriate thereto will be turned one additional step.

At the next operation of the machine, the lever 118 will be returned to its normal position in which the squared stud 116 engages the front face 117, by a disk 135 which has a downwardly extending arm 136 adapted to engage a flat surface 137 on the lever 118. This disk 135 is rocked in a clockwise direction by the engagement of a flat surface 138 on the driving segment 66 of the next lower order with a stud 139 carried by a projection of the disk 135. This clockwise movement of the disk 135 rocks the lever 118 about its pivot 119 until the half-round stud 121 carried by the arm 122 engages with the shoulder in the slot 124 and holds the lever 118 in its normal position.

*Auxiliary or higher order totalizer wheels.*

The machine, in its present embodiment, is provided with three auxiliary totalizer wheels (Fig. 8) for accumulating the overflow from the totalizer wheels appropriate to the amount banks. The construction and operation of the auxiliary totalizer wheels are identical with those of the amount banks except for the fact that they receive the entry of only one unit at a time by means of transfer mechanism.

The transfer mechanism for the auxiliary totalizer wheels (Fig. 2) is moved upon each operation of the machine by a plurality of pairs of cams 141 and 142 which cooperate with rollers carried by the ends of arms 143 and 144 of three-armed levers 145. Another arm 146 of each of the three-armed levers 145 is bifurcated at its upper end and straddles a stud carried by a segmental arm 147 on which is pivoted the transfer arm 62 for the auxiliary wheel. Upon each operation of the machine, the arm 147, which is loose on the stud 57, is rocked clockwise one tooth space and then returns to its normal position. If the totalizer element appropriate to the tens of dollars bank passes from its "9" to its "0" position during an operation, the long tooth thereof will trip the arm 125, thereby permitting the lever 118 to rock clockwise far enough to permit the squared stud 116 to contact the rearward face 128 in the lever 118. Then, upon movement of the arm 147 in a counter-clockwise direction (Fig. 2), the tooth 148 will engage the totalizer pinion 63 for the hundreds of dollars denomination and will turn this pinion one step, thereby adding "1" to its corresponding totalizer element.

In order to restore the levers 118 for the auxiliary totalizer elements to their normal positions after they have been tripped to permit a transfer, a disk 150 which has a depending arm 151 for contacting the flat surface 1152 of the lever 118, as pointed out previously, is actuated by the contact of a pin 152 carried by a projection of the disk 150, with the driving segment 66 of the tens of dollars differential unit. This pin 152 projects into the path of said driving segment 66 and when the segment is given its upward movement at the beginning of an operation of the machine, it contacts with the pin 152 and thereby rocks the disk 150 and its depending arm 151 clockwise. This movement, as before described, returns the lever 118 to its normal position. Each of the auxiliary totalizer wheels is provided with one of the disks 150 for returning the lever 118 to its normal position, and all of these disks are actuated simultaneously as they are connected by rods 153 and 154 provided for that purpose.

It will be understood that the cams 141 and 142 operate the transfer mechanism for the auxiliary totalizer elements successively from right to left, as is well known in the art.

*Totalizer resetting mechanism.*

Figure 9:
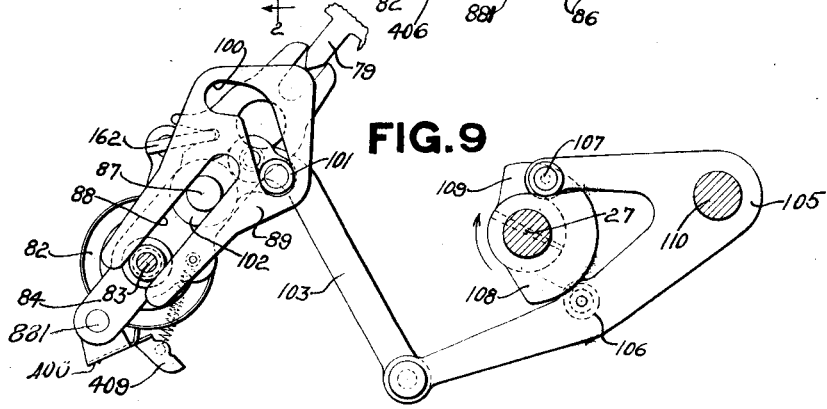
Fig. 9 is a detail sectional view taken just inside of the right hand side frame of the machine looking toward the left and shows the mechanism for engaging and disengaging the totalizer.
Figure 20:
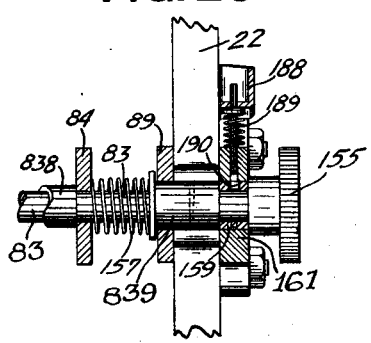
Fig. 20 is a detail view, partly in section, of a portion of the interlocking mechanism.

The totalizer is adapted to be reset to zero manually. Fast on the end of the totalizer wheel supporting shaft 83 is a knurled knob 155 (Figs. 7 and 20), by which the shaft may be turned for the purpose of resetting the totalizer wheels to zero. Each totalizer element is provided with the usual spring pressed pawl 156 (Fig. 4), which cooperates with a groove cut in the totalizer wheel supporting shaft 83 so that when the shaft is turned the wheels will be carried to their zero positions. In order to reset the totalizer to zero it is necessary to shift the totalizer supporting frame 86 bodily to the right (Fig. 8). A sleeve 838 (Fig. 20) fastened to the shaft 83 bears against the side frame arm 84. Thus, by pulling out the resetting knob 155 against the tension of a spring 157, which tends normally to hold the totalizer supporting frame 86 in its normal position, the totalizer frame is drawn to the right. When the knurled knob 155 has been pulled out, it is then rotated in a clockwise direction (Fig. 7) for the purpose of turning the wheels to zero. Fast on the end of the shaft 83, and beyond the knurled knob 155 is a lug 159 (Figs. 19 and 20) which normally rests in a slot 160 formed in a locking plate 161 fastened to the right hand side frame of the machine. It is apparent from Fig. 7 that while the lug 159 rests in the slot 160 in the plate 161 the shaft 83 can not be turned, and therefore, the totalizer elements can not be reset. When, however, the knurled knob 155 is drawn to the right, as seen in Figs. 8 and 20, and the rotation of the shaft 83 commenced, the lug 159 will be out of engagement with the slot 160 and will rest against the face of the plate 161, thereby holding the totalizer supporting frame 86 in its shifted position. When a complete rotation of the totalizer shaft 83 has been made, the lug 159 will again come into alinement with the slot 160 and, due to the spring 157, the totalizer supporting frame will be moved to the left (Figs. 8 and 20) to its normal position. The spring 157 is of sufficient strength to cause the totalizer supporting frame to return to its normal position the moment the lug 159 comes into alinement with the slot 160, and therefore, the totalizer elements will be stopped in their zero positions.

Figure 10:
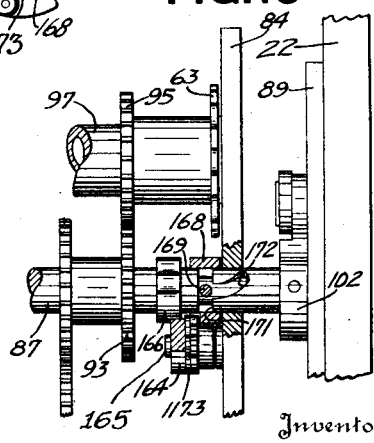
Fig. 10 is a detail view of the operating mechanism for the totalizer aliner.

When the totalizer is being reset to zero it is necessary to rock the aliner 162 out of engagement from the pinions 63, and this movement is accomplished by the following mechanism. Loosely mounted on the shaft 87 (Figs. 10 and 11), just to the left of the totalizer-supporting frame arm 84, is a collar 168 which has mounted therein two set screws 169 and 170, the inner ends of which normally enter an annular groove 171 cut in the shaft 87. A similar collar is located on the left hand side of the totalizer to the right of the cam 166 (not shown) and the arm 164. The collar 168 is provided with a recess in its left hand edge to cooperate with a spur 173 carried by a plate secured to the alining bar supporting arm 164. Also secured to said arm 164 is a plate 1173 which cooperates with the left side of the collar 168 to prevent relative lateral shifting of said arm and collar. It can be seen from Figs. 10 and 11 that when the shaft 87 is rotated, as just described above, the inner ends of the set screws 169 and 170 will ride in the annular groove 171 and will have no effect upon the aliner 162. The set screws 169 and 170 are also adapted to engage with a pair of cam grooves 172 cut in the shaft 87 with their open ends communicating with the annular groove 171, so that whenever the totalizer supporting frame 86 is shifted to the right to reset the totalizer, the collars 168 will be rocked clockwise, as viewed in Fig. 11, and through the spurs 173 and cooperating recesses formed in the edges of the collars 168 the aliner supporting arms 164 will be rocked counterclockwise about their pivots 165, to withdraw the aliner 162 from engagement from the teeth of the pinions 63.

Access to the totalizer resetting knob 155 is provided by means of a door 163 (Fig. 1) in the cabinet of the machine. This door is normally locked and access may be had only by the proprietor or some one authorized by him to turn the totalizer to zero.

Interlocks.

Interlocking mechanism is provided for locking the machine while the totalizer is being reset to zero and also for locking the totalizer against resetting movement during the operation of the machine. The means for locking the totalizer against a resetting operation during operation of the machine will be described first. Pivotally mounted on the plate 161 at 187 (Figs. 7, 19 and 20) is a bell crank lever 188 which, at its forward end, is bent to form a flange through which projects a spring-pressed pin 189. The inner end of this pin is adapted to enter a groove 190 formed in the top of the lug 159, for maintaining the totalizer in its normal position laterally during operation of the machine. The bell crank lever 188 is rocked by a shouldered, spring-pressed pin 191 projecting from the side of the locking lever 177 and seated in a recess on the end of the rearwardly extending arm of the bell crank lever 188. It can be seen from Fig. 7 that when the machine is released, as before described, the locking lever 177 will be rocked clockwise, thereby raising the pin 191 and rocking the bell crank lever 188 counter-clockwise. This movement causes the inner end of the pin 189 to move into the groove 190 (Figs. 19 and 20) in the lug 159 to prevent shifting the totalizer supporting frame 86 to the right for the purpose of resetting the totalizer. When, however, the operating mechanism is in its normal condition and the totalizer supporting frame is in its shifted position for the purpose of resetting the totalizer, the pin 189 will contact with the periphery of a collar 839 (Fig. 20) surrounding the shaft 83. As this collar has no groove therein it is impossible for the bell crank lever 188 to be rocked and the locking lever 177 is also locked by the engagement of the pin 191 with the recess in the rearwardly extending arm of the bell crank lever 188. Therefore, it is impossible for the stud 175 on the gear 26 to be moved from the depression in the groove in the arm 176 so that it is impossible to move the gear 26 and the operating mechanism.

Drawer release and alarm mechanisms.

The machine shown in the present application is mounted on a base 319 (Figs. 1 and 7) in a drawer 320 which is normally locked in its closed position. Mechanism is provided for releasing the drawer, which will then be automatically opened by means of a compressed spring, not shown herein, but well known in the art. This mechanism consists of a plunger 321 vertically mounted in the base 319. At its lower end, the plunger passes through an opening in a bracket 322 screwed to the back of the cash drawer 320 to latch the drawer in closed position. At its upper end, the plunger 321 is provided with a slot 323 through which projects a pin 324 carried by the rear end of an arm 325. This arm 325 is fast on a shaft 326 suitably mounted in the side frames 22 of the machine. Also fast on the shaft 326 is a forked lever 327 (Fig. 18). At the ends of both of the arms of the forked lever 327 are mounted rollers 328 and 329 to cooperate with a pair of cams 330 and 331, respectively, fast on the main drive shaft 27. These cams are given one complete rotation at each operation of the machine and their conformation is such that the lever 327 is rocked, first, counter-clockwise and then clockwise, (Fig. 18), and as this lever is fast to the shaft 326 this shaft and the lever 325 will also be rocked counter-clockwise and then clockwise. It can be seen from Fig. 7 that when the arm 325 is raised, the stud 324 will engage the upper end of the slot 323 in the plunger 321 and will raise the same far enough to free its lower end from the bracket 322, thereby releasing the cash drawer. The spring 332 is coiled about the plunger 321 between the collar 323 thereon and the pin 324 and normally tends to hold the plunger in its locking position. When a transaction has been completed and the cash drawer is returned to its closed position, a beveled portion of the bracket 322 will strike a corresponding beveled portion on the lower end of the plunger 321 to raise the same sufficiently to permit the drawer to come to its innermost position, in which position the plunger 321 will be forced downwardly by means of the spring 332 through the opening in the bracket 322 to lock the drawer in its closed position.

The alarm mechanism consists of a bell 334 supported by a stud 335 mounted in the side frame 22 of the machine. This bell 334 is adapted to be struck by a hammer 336 every time the cash drawer is opened. The hammer 336 is loose on the shaft 326. Fast on the shaft 326 is an upwardly extending arm 337 which, at its upper end, has projecting therefrom a pin 338 against which a projection 339 of the hammer 336 normally rests. The projection 339 is yieldingly held against the pin 338 by a spring 340 stretched between a pin carried by the hammer 336 and the pin 338. It can be seen from Fig. 18 that when the pair of cams 330 and 331 have completed about one-half of their revolution the roller 328 will pass the high point 341 of the cam 330 and will, therefore, permit the lever 327 to be rocked in a counter-clockwise direction under the influence of a spring 342 fastened to the end of a projection 343 of the lever 327. This movement of the lever 327 rocks the shaft 326 counter-clockwise, and therefore, the arm 337 receives a like movement, and the bell hammer 336 being attached to the lever 337 by spring 340 will be brought into contact with the bell 334. A long pin 344 projects from the side frame 22 and is so positioned as to stop the bell hammer just far enough from the bell so that the hammer does not rest against the bell after striking it which would deaden the sound. Near the end of the operation the cams 330 and 331 will return the parts to their normal positions, thus permitting the spring 332 to lower the plunger 321 so that it may lock the drawer in closed position as above stated.

Indicators.

The present machine is provided with indicators 192 (Fig. 4) of the roller type, loosely mounted on a shaft 193. There is one indicator for each of the banks of amount keys, and each of the indicators has fast to its hub a pinion 194 to engage the teeth of a segment 1195 pivotally mounted on a shaft 196 supported in the side frames 22. The segment 1195 carries a smaller segment 197, to which is pivoted at 198 the upper end of the link 81. It will be recalled that this link 81 is given a movement commensurate with the value of the key depressed by the beam 78 which, in turn, is controlled by the differentially movable actuator 60. It can, therefore, be seen that the segment 1195 will be moved differentially and this movement will be imparted to its corresponding indicator through the pinion 194.

An aliner 199, which, at its upper end, is bent at right angles to engage the teeth of the segment 197, is carried by a pair of arms 200 fast on the shaft 201 (Fig. 4) journaled in the side frames 22. The aliner 199 is normally in engagement with the teeth of the segment 197 and thereby alines the indicators 192 and keeps them from movement except during an operation of the machine. During an operation of the machine, the aliner 199 is rocked out of engagement from the teeth of the segment 197 in the following manner. Fast on the shaft 201 is an arm 202 to which is pivoted a link 203 which, at its lower end, is pivoted to one arm of a forked lever 204 (Fig. 3) loosely mounted on a shaft 205. Each of the arms of the forked lever 204 carries a roller to cooperate with a pair of cams 206 and 207 fast on the main shaft 27. The conformation of this pair of cams is such that upon the rotation of the shaft 27 during an operation of the machine, the link 203 will be moved first downwardly, thereby rocking the shaft 201 and arms 200 in a clockwise direction (Fig. 4) and removing the bent portion of the aliner 199 from the segment 197, thereby permitting the indicators to be set by the mechanism just described. After the indicators are set, the cams 206 and 207 cause the aliner 199 to engage the segment 197 to hold the indicators in the proper position.

Printing mechanism.

Figure 16:
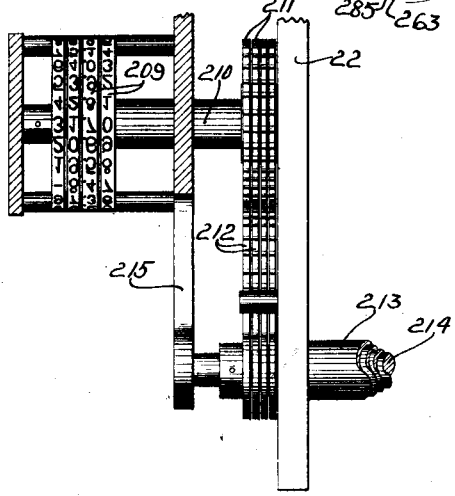
Fig. 16 is a front elevation of the mechanism for setting the type wheels. Part of the mechanism is omitted for the sake of clearness.

A printing mechanism is provided for printing the amount represented by the keys depressed upon a detail strip and a check. There are four printing wheels 209 (Figs. 12 and 16) which have two sets of figures thereon, each from "1" to "9" and "0", inclusive. The type faces are so arranged on the printing wheels 209 that the same character appears at the printing line, both on the top of the wheels and on the bottom simultaneously. The wheels 209 are fast on the left hand ends respectively, (Fig. 16) of a shaft 208 and nested sleeves 210, which at their right hand ends, carry segments 211, which in turn mesh with segments 212 fast on the left hand ends of a series of nested sleeves 213 surrounding a shaft 214 supported by the side frame 22 of the machine and the printer side frame 215. These sleeves 213 and shaft 214 carry at their right hand ends (Fig. 4) a series of arms 216 pivotally connected to the lower ends of the links 81 corresponding to the various denominations. As described above, these links are given a differential movement commensurate with the value of the key depressed upon every operation of the operating mechanism, and it can, therefore, be seen that this movement will be transmitted by the arms 216, shaft and sleeves 214 and 213, segments 212, segments 211, sleeves 210 and shaft 208 to the typewheels 209, and will position them to represent the amount to be registered by the machine.

Figure 15:
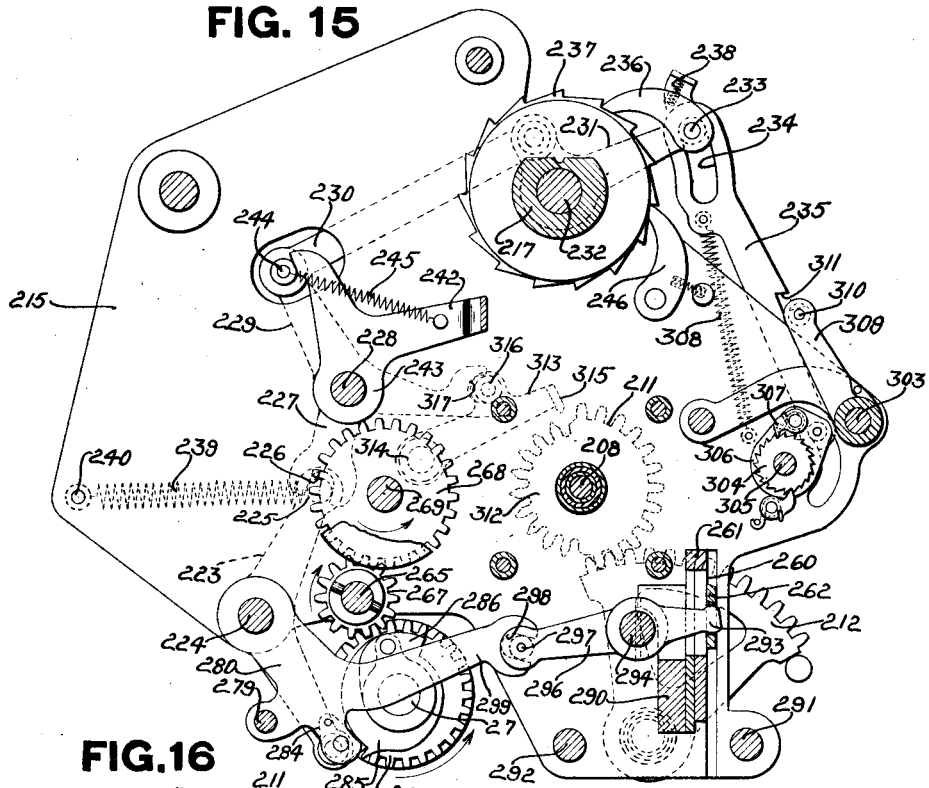
Fig. 15 is a sectional view through the printing mechanism looking toward the right.
Figure 17:
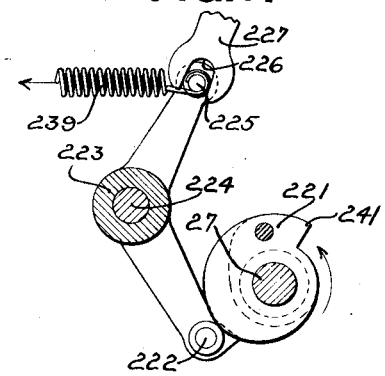
Fig. 17 is a detail sectional view of the mechanism for operating the platen for the detail strip and the type wheel alining mechanism.

The detail strip is carried on a supply roll 218 (Fig. 12) and from there is led about a roller 219 and about a roller 220 to the receiving roll 217. The supply roll 218 and the receiving roll 217 are carried on short studs projecting from the printer side frame 215. The detail strip is adapted to be fed one space upon each operation of the machine by the following mechanism. Fast on the main drive shaft 27, just to the left of the left hand side frame 22 of the machine, is a double cam 221 (Figs. 14 and 17), the face of which cooperates with a roller 222 carried by a downwardly extending arm of a lever 223. This lever 223 is pivotally mounted on a short shaft 224 supported by the printer side frame 215. The upwardly extending arm of the lever 223 carries a pin 225 projecting through an open end slot 226 in the lower end of a three-armed lever 227, pivotally mounted on a stud 228 (Fig. 15). The three-armed lever 227 has an upwardly extending arm 229 to which is pivoted a link 230 which at its opposite end is pivoted to one arm of a bell crank lever 231 mounted on a stud 232, which supports the receiving roll 217 for the detail strip. The other arm of the bell crank lever 231 has a lateral pin 233 which projects through a slot 234 in the upper end of a link 235, and which has pivotally mounted thereon a pawl 236, to engage the teeth of a ratchet 237, fast on the receiving roll 217. A spring 238 constantly tends to hold the pawl 236 in engagement with the teeth of the ratchet 237. During the first half rotation of the shaft 27, the double cam 221 will have no effect upon the lever 223, as this portion of the cam is concentric with the shaft 27. The lower end of the lever 223 has a sharp nose which also cooperates with the high point 241 of the cam 221 so that when the shaft begins its second half rotation the sharp nose of the lever will hold the roller 222 away from the cam and as the high point 241 of the cam 221 passes said nose, the lever 223 will thereby be permitted to move in a counter-clockwise direction (Fig. 17) about the shaft 224. The cam 221 is cut away on the dotted line as shown in Fig. 17, so as to provide a clearance for the nose of the lever 223 to permit the roller 222 to cooperate with the periphery of the cam at all points on the cam except the high point 241. A spring 239, normally under tension between the pin 225 carried by the upwardly extending arm of the lever 223 and a pin 240 projecting from the printer side frame 215, causes the lever 223 to rock counter-clockwise about the shaft 224. As the pin 225 carried by the lever 223 projects through the slot 226 in the downwardly extending arm of the three-armed lever 227 this lever will be rocked clockwise (Fig. 15) and the link 230 will transmit this clockwise movement of the three-armed lever 227 to the bell crank lever 231. As the bell crank lever 231 moves clockwise about the stud 232, the pawl 236 will be carried downwardly until the nose thereof engages with the next lower tooth of the ratchet 237. Then as the cam 221 returns to zero, it will rock the lever 223 clockwise (Fig. 17), and this movement will return the train of parts just mentioned to their normal positions, and, as the pawl 236 is in engagement with the next lower tooth of the ratchet 237, the ratchet, and therefore the receiving roll 217, will be moved one printing space in a counter-clockwise direction (Fig. 15). A spring-pressed pawl 246, pivotally mounted on the printer side frame 215, is in engagement with the teeth of ratchet 237 and prevents retrograde movement of the detail strip receiving roll.

The platen 247 (Fig. 12) for taking an impression on the detail strip from the type carries, is carried by an arm 242 (Figs. 12 and 15) of a bell crank lever 243 pivotally mounted on the short shaft 228. The other arm of the bell crank lever 243 extends upwardly and has at its upper end a flat surface engaging with a pin 244 carried by the upwardly extending arm 229 of the three-armed lever 227. It will be recalled that this three-armed lever is given a quick clockwise movement about the shaft 228 when the roller passes from the point 241 of the cam 221. It can be seen from Fig. 15 that this movement will rock the platen-carrying arm 242 clockwise about the shaft 228 and cause the platen 247 to strike the back of the detail strip directly over the type carriers 209, which have, previously to this time, been properly positioned, thereby taking an impression therefrom on the detail strip. A spring 245 is stretched between a pin on the platen-carrying arm 242 and the pin 244 for the purpose of holding the bell crank 243 in engagement with the pin 244.

The mechanism for printing and issuing the check will now be described. A roll of paper 248 (Fig. 12) is mounted upon a stud 249 projecting from the printer side frame 215. The paper strip passes from the roll 248 into a guide 250 supported by rods 251 and 252 projecting from the printer side frame. From the guide the paper strip passes between an electroroller 253 and an impression roller 254 (Figs. 12 and 13) driven by the main operating mechanism, as will be hereinafter described, and act as feeding means for the strip. The electroroller 253 carries an electroplate to print any desired data on the check, such as the merchant's name, address, etc. This electroplate is inked by an inking roller 255 rotatably mounted in the ends of a pair of arms 256, which are in turn loosely mounted on the short shaft 228. A spring 257 wound about the shaft 228, and hooked over the edges of a plate 272 spaced apart from and secured to the adjacent side frame 215, forces the inking roller 255 into contact with the type of the electroplate carried on the electroroller 253. After an impression is taken on the check from the electroroller 253, it passes beneath the typewheels 209 and is brought into contact with the type faces thereon by a platen 258 carried by an arm 259 pivotally mounted on the shaft 224. After receiving this impression from the type carriers, the check strip is fed through an opening 260 (Fig. 15) between a stationary knife 261 and a movable knife 262, and upon the further operation of the machine, is severed by the co-action of the movable and stationary knives. The check is then fed through an opening 1246 (Fig. 1) in the casing of the machine into such a position that it can be grasped by the fingers of the operator and removed from the machine.

The mechanism for driving the electroroller 253 and the impression roller 254 to feed the check includes a pair of gears 263 (Figs. 14 and 15) on the right hand end of the shaft 27. The left hand gear is fast on the shaft 27 and is connected to the cam 221. The right hand gear is loose on the shaft and is connected to cams 285 and 286 which, respectively, cooperate with the platen 258 and the movable knife 262. This pair of gears normally meshes with a pair of pinions 264 fast on a laterally movable shaft 265. Mounted on a hub 266 is a gear 267 which meshes with a gear 268 mounted on a stud 269 carried by the printer side frame 215. The hub 266 has a slot 270 cut therein through which projects a pin 271 carried by the shaft 265. Rotation of the shaft 265 will be transmitted by the pin 271 to the hub 266 and gear 267. This pin and slot connection permits relative lateral movement between the shaft 265, and gear 267 which is held against lateral movement by a disk 402 secured to the gear 268. It can be seen from Fig. 14 that when the main drive shaft 27 is given one complete rotation the movement thereof will be transmitted by one of the gears 263 and 264 to the shaft 265 on which the impression roller 254 is mounted, and from the shaft 265 through gear 267, to gear 268 fast to the end of the electroroller 253, which will be rotated thereby.

At certain times it may be desirable to disable the check feeding mechanism, and for this purpose the shaft 265 is slidable endwise in its supporting frames 215 and 22 and the stationary plate 272, carried on the ends of the rods 273 and 274 and the shaft 228. Fast on the shaft 265 just to the right of the plate 272 (Fig. 14) is a knob 275 which, when it is desired to disable the check issuing mechanism, is pulled out. This will slide the shaft axially as above described to remove the right hand one of the pair of gears 264 from the right hand one of the pair of gears 263 (Fig. 14), and bring the left hand one of the gears 264 into engagement with the right hand one of the gears 263. As the right hand one of the gears 263 is loose on the drive shaft 27, the movement of the shaft 27 will not be imparted to the shaft 265 and therefore the check feeding mechanism will be disabled. A pin 400 on the plate 272 cooperates with a slot in the hub of the impression roller 254 to prevent rotation thereof when the feeding mechanism is disabled. When the knob is pushed in, the parts will resume their normal positions, as shown in Fig. 14. Movement of the knob 275 during operation of the machine is prevented by a disk 401 secured to the side of the left hand gear 263 and of like dimension therewith. This disk is cut away to permit a lateral movement of the gears 264 only when the machine is at rest.

The arm 259 carrying the platen 258 is operated in the following manner. See Figs. 14 and 15. The arm 259 is mounted on a hub 277, which also carries another arm 278 projecting downwardly therefrom and contacting at its lower end with a pin 279 carried by a lever 280 (Fig. 15) pivotally mounted on shaft 224. The downwardly extending arm 278 is yieldingly held in engagement with the pin 279 by a spring 281 (Fig. 12) stretched between the pin 279 and a pin 282 on the platen-carrying arm 259. The lever 280 carries a roller 283 (Fig. 12) which, together with a lug 284, also carried by the lever 280, cooperates with a pair of cams 285 and 286, loose on the shaft and pinned to the right hand pinion 263.

When the drive shaft 27 is given a rotation during an operation of the machine, the roller 283 and lug 284 on the lever 280 will pass the high point of the cam 286 and will then be permitted to move in a counter-clockwise direction. This movement is effected by a spring 287 fastened to a pin 288 projecting from the lever 280 at one end, and at its opposite end made fast to a stud 289 projecting from the side frame 22 of the machine. This spring will give the lever 280 a rapid counter-clockwise movement, and as the pin 279 is in engagement with the arm 278, fast on the hub 277 of the platen-carrying arm 259, this arm will also be moved counter-clockwise to bring the platen 258 against the typewheels and take an impression on the check.

The check is severed from the check strip by a movable knife 262 (Fig. 15) slidably mounted in the bar 290 supported by the plates 215 and 295. Cooperating with the movable knife 262 is the stationary knife 261 supported by the bar 290 and in which is cut an opening 260 through which the check strip is fed. The movable knife 262 is given its movement by a pair of arms 293 which are fast on a shaft 294 supported in the printer side frame 215, and a plate 295 mounted on the rods 291 and 292. This shaft 294 has a rearwardly extending arm 296 fast thereon, which at its rear end carries a pin 297 projecting through a slot 298 in the forward end of an arm 299 of the lever 280. It will be remembered that this lever 280 cooperates with the cams 285 and 286, and near the end of the operation of the machine, the cam 285 rocks the lever 280 above its pivot 224. Through the slot and pin connection above described, this movement will rock the shaft 294 counter-clockwise and, through the arms 293, raise the movable knife 262 and sever the check from the check strip.

As hereinbefore stated, the cams 285 and 286 are loose on the shaft 27 and are pinned to the right hand pinion 263. It is therefore seen that movement of the knob 275 to disable the check feeding means will also disable the check impression means and severing means.

An endless inking ribbon (Fig. 12) is provided for the type wheels 209. It extends from an inking roller 300 around four rods which surround the type wheels 209, under a roller 301 carried by a pair of arms 302 pivotally mounted on a rod 303 projecting from the printer side frame, and back to the inking roller 300. The roller 301 is adapted to rest upon the inking ribbon and maintain a certain amount of tension thereon. The inking ribbon is fed by means of a ratchet 304 (Fig. 15) fast on the shaft 305 of the inking roller 300. Loosely mounted on the shaft 305 is a plate 306 on which is mounted a spring-pressed pawl 307 which cooperates with the teeth of the ratchet 304. Also pivotally connected to the plate 306 is the lower end of the link 235. It will be remembered that this link is permitted to drop under the influence of a spring 308 when the bell crank lever 231 for feeding the detail strip is operated. When this bell crank lever 231 is returned to its normal zero position, the link 235 will be raised by the engagement of the pin 233 with the upper end wall of the slot 234 and will thereby rock the plate 306 and through the pawl 307 and ratchet 304, move the inking roller 300 one space. Pivotally mounted on the shaft 303 is an arm 309 which, at its upper end, carries a half round stud 310 adapted to engage with a shoulder 311 on the link 235 and prevent the link 235 from moving in a downward direction more than is necessary to feed the inking ribbon one space.

Secured by a sleeve connection to the arm 309 is an arm 403 (Fig. 12) which projects into the path of buttons 404 fastened to the inking ribbon hereinbefore referred to at, points so as to be moved into cooperation with the arm 403 to move the arm 309 clockwise when the seam 405 of the ribbon is in position to be moved into alinement with either impression means during the next operation of the machine. This moves the stud 310 out of the path of the shoulder 311, and the driving link 235 for the ribbon feed roller will move a greater distance and consequently move the seam of the ribbon beyond the platens.

Formed integral with the segment 211, (Fig. 15) which cooperates with the segment 212 to position the type carriers 209, is a smaller segment 312. An arm 313 (Fig. 15), pivotally mounted at 314 on the printer side frame 215, has its end bent to form a flange 315 which engages with the teeth of segment 312 during a certain portion of the operation of the machine. The arm 313 has an upwardly extending projection which carries a roller 316 in engagement with the bifurcated end of the forwardly extending arm of the three-armed lever 227. It will be recalled that this lever 227 is given a clockwise rotation in order to take an impression on the detail strip. It is apparent, then, that as the platen arm 242 moves down to take an impression, the arm 313 will also be moved downwardly by the three-armed lever 227. The flange 315 on arm 313 will engage between the teeth of the segment 312 and aline and lock the type carriers in their adjusted positions during the taking of the impression. When the platen arm 242 is returned to normal the arm 313 will be raised and the flange 315 will be removed from the teeth of the segment 312, thereby permitting it and the type carriers to be moved to their new positions.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of a resettable totalizer, an operating device operable in one direction to enter amounts in said totalizer, and means operable upon an operation of said operating device in a reverse direction for preventing a resetting operation of said totalizer as amounts are entered.

2. In a machine of the class described, the combination of a resettable totalizer, an operating device for entering amounts in said totalizer, and means operable upon reverse movement of said operating device to prevent a resetting operation of said totalizer during a forward movement of said operating device and releasable by said operating device near the end of the forward movement.

3. In a machine of the class described, the combination of a resettable totalizer, an operating device for entering amounts in said totalizer, a normally effective lock for said operating device, and means operable as said lock moves to release position for preventing a resetting operation of said totalizer during an operation of the operating device.

4. In a machine of the class described, a totalizer and alining means therefor mounted for lateral movement, and means operated by a lateral movement of said alining means for moving the alining means out of operative position.

5. In a machine of the class described, the combination of a totalizer, alining means therefor, a laterally shiftable supporting means therefor, and means operated by a movement of said supporting means for moving the alining means out of alining position.

6. In a machine of the class described, the combination of a totalizer, alining means therefor, means for supporting the totalizer and alining means for lateral movement, and cam means operated by a movement of said totalizer and alining means for moving the latter out of alining position.

7. In a totalizer construction, totalizer wheels, alining means therefor movable radially thereof, and means movable relatively to and parallel with the axis of rotation of said totalizer wheels for moving said alining means out of alining position.

8. In a totalizer construction, totalizing means, pivoted alining means therefor, and means for moving said alining means into inoperative position, said alining means and said means for moving the same being mounted for relative lateral bodily movement.

9. In a machine of the class described, the combination of actuator-engaging totalizing wheels, aliner means, reading wheels, gear wheels connecting said totalizer and reading wheels, a rod supporting said gear wheels, a cam on said rod, a movably mounted frame supporting said totalizer wheels, gear wheels, reading wheels, and aliner means, and means cooperating with said cam and operated by said aliner means upon movement of said frame for moving the aliner means out of operative position.

10. In a machine of the class described, the combination of a totalizer, alining means therefor, means for supporting said totalizer and alining means for lateral movement, and cooperative means on said alining means and supporting means operated by a lateral movement of said alining means to move said alining means into inoperative position.

11. In a machine of the class described, the combination of a group of totalizer wheels, a group or reading wheels geared to said totalizer wheels, aliners for the totalizer wheels, zero stops for the reading wheels, a slidably mounted frame supporting said groups of wheels, stops, and aliners, means operated upon movement of said frame for moving said aliners and stops into inoperative position, means supporting said frame for movement axially of said wheels, and means operated by said latter movement of said frame for moving said aliners into operative position.

12. In a machine of the class described, a totalizer, a turn-to-zero shaft mounted for axial movement, an operating device for entering amounts in said totalizer, a lock for said device, and means positioned by an axial movement of said shaft to prevent movement of said lock to unlocking position.

13. In a machine of the class described, the combination of a main driving mechanism, means for normally locking the main driving mechanism, a totalizer, means for resetting the totalizer to zero, and means for disabling said locking mechanism, said disabling means being ineffective when the totalizer is being reset.

14. In a machine of the class described, the combination of a main driving mechanism, means for normally locking the main driving mechanism, means for rendering said locking means ineffective, a totalizer, means for resetting the totalizer to zero, and means whereby the totalizer is locked against resetting during an operation of the main driving mechanism.

15. In a machine of the class described, the combination of a main driving mechanism including a gear carrying a pin, a pivoted stop-arm normally in engagement with the pin for the purpose of locking said driving mechanism, a pair of steps on said stop-arm, and pivoted means involving a plurality of arms, one arm of which is in engagement with the teeth of the said gear, and another arm of which contacts with the lowermost of said pair of steps on the stop-arm so that when the said gear is given a reverse movement the pivoted means will move its first-mentioned arm from the lowermost step on the said stop-arm to permit the next higher step to move into engagement therewith, thereby permitting the stop-arm to move away from the before-mentioned pin on the said gear to release the machine.

16. In a machine of the class described, the combination of a machine frame member, a totalizer, including totalizing wheels, a slidably mounted frame supporting said totalizer, a supporting shaft for said totalizer wheels mounted to move with said totalizer frame and extending through a slot in the machine frame member, a slotted plate fast on said frame member, a lug fast on said shaft and normally resting in said slot in said plate, a knob on the end of said shaft for moving said shaft laterally to disengage the lug from the slotted plate and for rotating it to turn the totalizer wheels to zero, and a spring bearing against said totalizer frame for returning said shaft to its normal position at the end of the resetting movement.

17. In a machine of the class described, the combination of a main frame member, a slidably mounted totalizer supporting frame, a totalizer involving wheels, a shaft carried by said totalizer frame supporting said wheels and extending through a slot in the main frame member, a grooved lug fast on said shaft and normally resting in said slot, a knob on the end of said shaft for sliding the totalizer frame endwise far enough to free the said lug from the said slot and then for rotating said shaft to reset the totalizer to zero, and a pin extending through a wall of said slot and cooperating with said groove in the said lug during item entering operations for preventing the sliding of said totalizer frame into a position permitting a resetting movement.

18. In a machine of the class described, the combination of a main operating mechanism, a slotted member supporting said mechanism, totalizer wheels, a slidably mounted frame therefor, a shaft supporting the totalizer wheels and extending through the slot in said member, a lug fast on said shaft and normally resting in said slot, a knob on the end of said shaft for sliding the totalizer frame endwise far enough to free the said lug from the said slot and then for rotating said shaft to reset the totalizer wheels to zero, a lever carrying a pin, guide ribs on said lug adapted to cooperate with said pin to prevent the sliding of said totalizer frame into a position to permit a resetting movement, and means operated by the main operating mechanism for rocking said lever to cause said pin to cooperate with said ribs.

19. In a machine of the class described, the combination of a main operating mechanism, releasing mechanism therefor, a main frame, totalizer wheels, a slidably mounted frame, a shaft supporting the totalizer wheels and extending through said slidable frame and a slot in the main frame, a grooved lug fast on said shaft and normally resting in said slot, a knob on the end of said shaft for sliding the totalizer frame endwise far enough to free the said lug from the said slot and then for rotating said shaft to reset the totalizer wheels to zero, a lever, a pin on said lever adapted to cooperate with the groove in said lug to prevent the totalizer frame from sliding into a position permitting a resetting movement, a collar carried by the said shaft which, when the totalizer is slid to its resetting position lies under the said pin on the before-mentioned lever, and means cooperating with said lever for preventing a release of said main driving mechanism when said pin and collar are in cooperative position.

20. In a totalizer construction, a totalizer, alining means therefor, a laterally movable supporting frame for said totalizer and alining means, rotatable means movable laterally with the frame for controlling the alining means, and means for operating said rotatable means upon lateral movement of the supporting frame.

21. In a machine of the class described, the combination of a group of totalizer wheels, a group of reading wheels geared to said totalizer wheels, alining means for the totalizer wheels, pivoted stops for arresting the reading wheels in home position during resetting operations, a slidably mounted frame supporting said groups of wheels, stops, and alining means, and means operated upon movement of said frame for moving said alining means and stops into inoperative position.

In testimony whereof I affix my signature.

BERNIS M. SHIPLEY.